(No Model.)
F. VAN RYSSELBERGHE.
SYSTEM OF ELECTRICAL DISTRIBUTION.
No. 360,492. Patented Apr. 5, 1887.
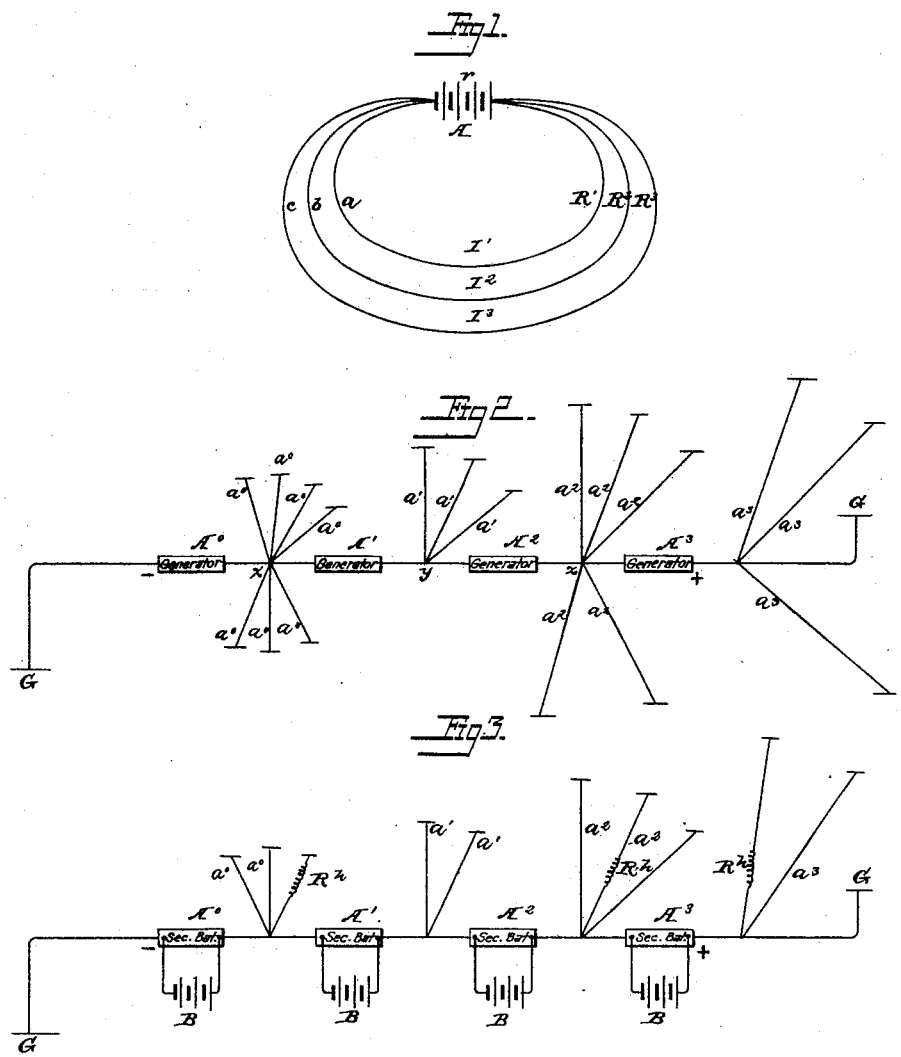

UNITED STATES PATENT OFFICE.

FRANÇOIS VAN RYSSELBERGHE, OF SCHAERBEEK, BELGIUM.

SYSTEM OF ELECTRICAL DISTRIBUTION.

SPECIFICATION forming part of Letters Patent No. 360,492, dated April 5, 1887.

Application filed June 8, 1886. Serial No. 204,503. (No model.)

*To all whom it may concern:*

Be it known that I, FRANÇOIS VAN RYSSELBERGHE, a subject of the King of Belgium, residing at Schaerbeek, Belgium, have invented certain new and useful Improvements in Systems of Electrical Distribution, of which the following is a specification.

The object of my invention is the simplification of distribution of current to a great number of telegraph-lines of different lengths from a single central station.

It is understood by those skilled in the art that if the internal resistance of a generator is very small as compared with the resistance of lines charged by such generator the current received by each line is a function of the resistance of such line and of the electro-motive force of the generator. In my invention I make use of this principle for distributing, as near as may be, equal currents to a great number of lines of greatly-different resistances from a single system of generators or from a single generator.

In one form of my invention I make use of secondary batteries as the proximate source of current, and in that case I keep the secondary batteries charged either by a primary battery or by any other generator. All this will more fully appear from the following description, in which reference is made to the accompanying drawings, in which—

Figure 1 is a diagram illustrating the general law of current distribution, and Figs. 2 and 3 illustrate in skeleton my invention.

In Fig. 1 a single source of current or generator, A, is represented as charging three lines, $a\ b\ c$. Let the internal resistance of the generator be $r$, and the resistances of lines $a\ b\ c$ be respectively $R_1\ R_2\ R_3$. The total current furnished to the system is $$I = \frac{E}{r + \frac{R_1\ R_2\ R_3}{R_1\ R_2 + R_1\ R_3 + R_2\ R_3}}$$

If the resistances of the three lines are equal—i. e., if $R_1 = R_2 = R_3$—they may all be denoted by $R$, and the above expression changes into $$I = \frac{E}{r + \frac{R^3}{3\ R^2}} = \frac{E}{r + \frac{R}{3}}$$

and if the internal resistance of the generator is very small as compared with the resistance of one line, $r$ may be neglected without error, and we have $$I = \frac{3\ E}{R}$$

This being the total current supplied to the system, each line will receive $$\frac{E}{R} = \frac{I}{3}$$

but if line $a$ alone is closed, the current will be $$I = \frac{E}{R} = \frac{I}{3}$$

and similarly the current for lines $b$ and $c$ will be $$I_2 = \frac{E}{R} = \frac{I}{3} \quad \text{and} \quad I_3 = \frac{E}{R} = \frac{I}{3}$$

*i. e.*, the current for each line, when the same alone is closed, is equal to one-third the current supplied to the whole system, from which it follows that if all the three lines are closed each will receive the same strength of current as if it alone were closed. This is a familiar principle, which, however, is only then strictly correct when the internal resistance is exceedingly small as compared with the resistance of a single line. In that case, however, it is true for any number of lines.

In Fig. 2 my system of distribution, based upon the principles stated, is indicated. There are a number of generators, $A^0\ A'\ A^2\ A^3\ ----$, of very low internal resistance, connected in series at one station, as shown. One terminal of the series is grounded at G, and from the couplings of the generator lines $a^0\ a'\ a^2$, &c., proceed to distant stations. Similar lines also proceed from the other terminal of the series of generators.

In an extensive system of telegraphy the lines proceeding from a central station may be arranged or divided into groups, each line of any one group having the same or nearly the same resistance as every other line of the same group. The lines of the same group all proceed from the same coupling, and they consequently receive the same current. Thus all lines proceeding from coupling $x$ receive a current $II_0 = \dfrac{E_0}{R_0}$; the lines proceeding from $y$ receive the current $I_1 = \dfrac{E_0 + E_1}{R_1}$; the lines proceeding from $z$ receive the current $I_2 = \dfrac{E_0 + E_1 + E_2}{R_2}$, &c., when by $E_0$ $E_1$ $E_2$, &c., the electro-motive forces of generators $A^0$ $A^1$ $A^2$, &c., are denoted, and by $R_0$ $R_1$ $R_2$, &c., the resistances of lines $a_0$ $a_0$ --- $a_1$ $a_1$ $a_1$ --- $a_2$ $a_2$ $a_2$, &c., are expressed. In order that all these currents be equal we must make $$\dfrac{E_0}{R_0} = \dfrac{E_0 + E_1}{R_1} = \dfrac{E_0 + E_1 + E_2}{R_2} = \&c.$$

This is very easily done if the generators $A_0$ $A_1$ $A_2$, &c., are equal, so that $E_0 = E_1 = E_2$, &c., for in that case the condition to be satisfied is, $\dfrac{E_0}{R_0} = \dfrac{2E_0}{R_1} = \dfrac{3E_0}{R_2}$, &c., and it will be satisfied if $R_1 = 2R_0$, $R_2 = 3R_0$, $R_3 = 4R_0$, &c. In other words, if the electro-motive forces of the generators, coupled up in series, are equal, each line of the group $a$ $a$ -- must have twice the resistance of a line of group $a_0$ $a_0$ --, each line of group $a_2$ $a_2$ -- three times the resistance of a line $a_0$, each line of group $a_3$ $a_3$ --- four times the resistance of a line $a_0$ &c.

The practical application of my invention will now be easily understood. I arrange the lines to be charged into groups, each line of which has the same or very nearly the same resistance, the resistances of each line of the successive groups having the relation of 1:2:3:4, &c. Supposing I am enabled to form a group of lines, $a_0$ $a_0$ --, each being ten miles long, the second group, $a_1$ $a_1$ --, must then be composed of lines twenty miles long, the third, $a_2$ $a_2$ --, of lines thirty miles long, &c. I then provide generators of extremely low internal resistances, but of such electro-motive force that each will be sufficient to furnish the required current to a line of ten miles. These generators $A^0$ $A^1$ $A^2$ $A^3$ are then connected in series, and the lines are connected to the same as follows: To the coupling of $A^0$ and $A'$ the ten-mile group is attached, to the coupling of $A'$ and $A^2$ the twenty-mile group is attached, to the coupling of $A^2$ and $A^3$ the thirty-mile group is attached, &c. If these conditions are strictly fulfilled, each line of the whole system will receive the same amount of current. It is, however, clear that the existing lines of a system will very rarely be of such individual lengths as to admit of the grouping of the same in the exact relation 1:2:3:4, &c.; but for practical purposes this is not necessary, for a slight deviation from the relation does not impair the practicability of my system of distribution. Besides this, I can easily adjust and do adjust the resistances of a group to give to each line the same resistance by inserting into the shorter lines a corresponding artificial resistance.

Supposing the lines of which it is desired to form one group have the respective lengths of nine miles, nine and one-half miles, ten miles, it is only necessary to add 1 mile, ½ mile, 0 miles, artificial resistance, respectively, in order to produce a perfect group.

The loss of current occasioned by the introduction of the artificial resistance is of very little consequence as compared with the great advantages of my system. This is indicated in Fig. 3, where Rh denotes an artificial resistance in the line wherever it occurs.

If the proximate source of current is a secondary battery, which recommends itself on account of its low internal resistance and constancy, the ultimate source may be a dynamo-electric generator or a primary battery, B, by which the secondary battery (preferably each separately) is charged. This is also indicated in Fig. 3. In the arrangements made under my invention, the first generator of the series, $A^0$, furnishes current to all lines of the whole system. It must, therefore, be correspondingly large. The successive generators $A'$ $A^2$ $A^3$, &c., furnish currents to a successively smaller number of lines, and they may therefore be correspondingly smaller. It will also be apparent that in place of a number of independent generators coupled in series, a single generator divided into sections of equal electro-motive force may be used, each section being used as and having the functions of an individual generator. Thus, if $A^0 A' A^2 A^3$, &c., are primary or secondary batteries, they may as well be considered as sections of a single battery. The same may be done with other generators.

While, for the sake of simplicity, I have described the system of distribution as divided into groups, the lines of which have resistances related to each other, as 1:2:3:4, &c., I have found that the relation need not be so simple. In fact, any desired relation may be accepted—as, for instance, 1:1½:1¾:2, &c., if the successive generators or sections of a generator are made accordingly. The above relation may also be expressed in whole numbers, thus: 4:6:7:8; or 8:12:14:16; or 8:8+4:8+(4+2):8+(4+2+2,) and in other ways, always in whole numbers.

If the last mode of expressing the relation be adopted, a simple general rule for determining the electro-motive forces of the successive generators or sections of a generator may be obtained. Suppose the resistances of lines $a^0$, $a'$, $a^2$, $a^3$ be $m$, $m+x$, $m+(x+y)$, $m+(x+y+z,)$ respectively. These resistances may also be expressed by:

$m$, $m(1+\dfrac{x}{m})$, $m(1+\dfrac{x+y}{m})$, $m(1+\dfrac{x+y+z}{m})$.

If $E_0$ is the electro-motive force required to give a certain current to the first line, the other lines require the electro-motive forces $E_0(1+\dfrac{x}{m})$, $E_0(1+\dfrac{x+y}{m})$, $E_0(1+\dfrac{x+y+z}{m})$, in order to receive the same current.

In order to obtain the electro-motive forces of the successive sections of generators, the electro-motive forces of the preceding sections must be subtracted from the above. This gives to sections:

$A^0$: the E. M. F. $= E_0 = \text{------} = E_0;$ $A^1$: the E. M. F. $= E_0\left(1 + \dfrac{x}{m}\right) - E_0 = E_0 + \dfrac{E_0 x}{m} - E_0 = \dfrac{E_0 x}{m};$ $A^2$: the E. M. F. $= E_0\left(1 + \dfrac{x+y}{m}\right) - \left(E_0 + \dfrac{E_0 x}{m}\right) = \text{------} = \dfrac{E_0 y}{m};$ $A^3$: the E. M. F. $= E_0\left(1 + \dfrac{x+y+z}{m}\right) - \left(E_0 + \dfrac{E_0 x}{m} + \dfrac{E_0 y}{m}\right) = \text{---} = \dfrac{E_0 z}{m}.$ These expressions may be also written as follows: The electro-motive force of the first section being designated by $E_0$, that of the second section by $E_1$, that of the third section by $E_2$, &c., we have:

$$E_0 = E_0,$$
$$E_1 = \dfrac{E_0 x}{m} = \dfrac{E_0}{m} x,$$
$$E_2 = \dfrac{E_0 y}{m} = \dfrac{E_0}{m} y,$$
$$E_3 = \dfrac{E_0 z}{m} = \dfrac{E_0}{m} z, \&c.$$

$\dfrac{E_0}{m}$, however, is the current I, supplied to a line of the first group, and therefore:

$$E_0 = E_0$$
$$E_1 = I x$$
$$E_2 = I y$$
$$E_3 = I z,$$

where $x, y, z$, &c., are the differences between the resistances of two lines of two successive groups. The electro-motive force of a section of the generator is therefore equal to the product of the difference of resistance of a line of the group connected to the section and a line of the preceding group into the current supplied to a line of the first group of the series.

It will be observed that in these computations a mile of wire may be used as the unit of resistance. This is illustrated in the following numerical example: Supposing that in a given system we collect groups of three, five, six, eleven miles, and it is found that a generator having the electro-motive force $=10$ volts is required to furnish to the three-mile group the required current, the series of resistances is: $3, 3+2, 3+(2+1), 3+(2+1+5)$ miles, and the required electro-motive force is, for generators:

$$A^0 = 10 \text{ volts,}$$

for $\quad A^1 = \dfrac{10 \times 2}{3} = 6\tfrac{2}{3}$ volts, for $\quad A^2 = \dfrac{10 \times 1}{3} = 3\tfrac{1}{3}$ volts, and for $\quad A^3 = \dfrac{10 \times 5}{3} = 16\tfrac{2}{3}$ volts.

All the generators together must furnish the electro-motive force $= 10 + 6\tfrac{2}{3} + 3\tfrac{1}{3} + 16\tfrac{2}{3} = 36\tfrac{2}{3}$ volts.

While I contemplate using my system of distribution chiefly upon telegraph-lines, it will be understood that I do not confine myself to such use, my system being equally useful for the distribution of current for all purposes; nor do I limit myself to the details of arrangements shown or described, since the same may be varied in many ways without departing from the principles of my invention.

What I claim, and desire to secure by Letters Patent, is—

1. In a system of electrical distribution, the combination of a sectional generator of low internal resistance with groups composed of lines having the same resistance charged by the generator, the lines of each group having greater resistance than the lines of the preceding group and the generator-sections being proportioned, as described, to give equal current to all lines.

2. In a system of electrical distribution, the combination of a series of groups of lines, the lines of the same group having the same and those of different groups having different resistances, with a sectional generator or a series of connected generators having low internal resistance, to each of which a group of lines is connected, each section being so proportioned that all lines and each of them separately will receive the same amount of current, substantially as described.

3. In a system of electrical distribution, a series of groups of lines, the lines of each group having the same length and being longer than the lines of the preceding group, in combination with a series of electrical generators of low internal resistance connected in tension, and having each a group of lines connected to one of its terminals, the electro-motive force of each generator being equal to the product of the current supplied to a line of the first group of the series into the difference of length of a line of the group connected to the said generator and the length of a line of the preceding group.

4. A system of electrical distribution consisting of a sectional secondary battery or a series of secondary batteries connected in tension charged by primary generators in sections, and a series of groups of lines charged by the secondary battery, each group composed of lines of equal resistance, but the lines of the successive groups having greater resistance than the lines of the preceding group, the electro-motive force of each section of secondary battery being proportioned to combine with the preceding sections to furnish equal current to all lines, substantially as described.

In testimony whereof I have signed my name to this specification in the presence of two subscribing witnesses.

FRANÇOIS VAN RYSSELBERGHE.

Witnesses:
 C. SELDEN,
 EDGAR W. DAY.